Nov. 26, 1968  F. SINGER  3,412,666

DIAPHRAGM ARRANGEMENT FOR PHOTOGRAPHIC EQUIPMENT

Filed Sept. 20, 1965

United States Patent Office 3,412,666
Patented Nov. 26, 1968

3,412,666
DIAPHRAGM ARRANGEMENT FOR PHOTOGRAPHIC EQUIPMENT
Franz Singer, Munich, Germany, assignor to Compur-Werk Gesellschaft mit beschrankter Haftung & Co., Munich, Germany
Filed Sept. 20, 1965, Ser. No. 488,533
Claims priority, application Germany, Nov. 6, 1964, C 34,303
6 Claims. (Cl. 95—64)

ABSTRACT OF THE DISCLOSURE

A diaphragm arrangement for photographic equipment includes diaphragm elements arranged in a housing and movable by a control ring to form different apertures. A setting ring includes an indicator cooperating with a scale, and a releasable coupling device clamps the two rings together in adjustably different relative positions for common movement.

---

This invention relates to a diaphragm arrangement for photographic equipment, whereby the diaphragm elements can be set to various values of diaphragm aperture by means of a diaphragm control member, an indicator which cooperates with a diaphragm scale signalling the value of the diaphragm aperture selected at any time.

It is an object of the present invention to provide a simple arrangement for adapting the diaphragm scale to a diaphragm aperture diameter, which varies with the focal length of the objective. This object is met by the use of a releasable coupling device, which can be clamped in different relative positions, between the diaphragm control member and the indicator.

In accordance with a further feature of the invention, in the case of a diaphragm arrangement in which the indicator is in the form of the radial arm of a diaphragm setting ring and the diaphragm control member is constituted by a diaphragm control ring which operates the diaphragm blades and is co-axial with the diaphragm setting ring, the coupling device will advantageously be implemented by the arrangement in which the diaphragm control ring carries a coupling pin which is adapted to be brought into positive engagement with the coupling opening in a connecting plate, this plate being adjustable and fixable in different positions relatively to the diaphragm setting ring by means of a screw-slot-clamping arrangement.

A further feature of the invention provides for the plate having a plurality of coupling openings for the coupling pin offset from one another in the peripheral direction.

One embodiment of the invention is described in details below in reference to the accompanying drawing. In this drawing.

Figure 2:
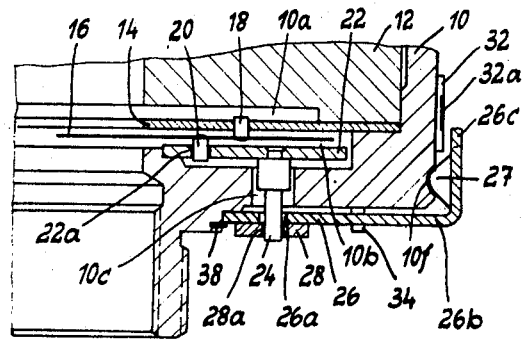
FIG. 2 illustrates a detail of this assembly in cross section and on a larger scale.

The drawing depicts a shutter and diaphragm assembly of a kind known per se, the mechanism of which is installed in a housing 10. A mounting ring 14 is inserted in a fixed position between the housing 10 and a base plate 12 arranged in the interior of the housing to form annular spaces 10a and 10b. The parts 12 and 14 are, during assembly, fastened together and to the housing 10 by screws (not shown), for example, five shutter blades (not shown) are arranged in the annular space 10a and, similarly, five diaphragm blades 16 in the annular space 10b. Each diaphragm blade 16 is provided with a mounting pin 18 and a control pin 20. Each mounting pin 18 engages in a mounting opening in the bearing ring 14 for mounting the diaphragm blade 16, only one of these having been fully illustrated for the sake of clarity in FIG. 2. Moreover the control pin 20 engages in a control slot 22a in a control ring 22, and by rotation of this ring the diaphragm blades 16 are caused to pivot about the mounting pins 18.

A coupling pin 24 is riveted into the control ring 22, and this projects rearwardly out through an arcuate slot 10c in the rear wall of the housing 10. This coupling pin 24 is long enough to pass through an arcuate slot 26a in a diaphragm setting ring 26 which is mounted on the rear wall of the housing 10 and is held axially by a spring ring 38. Said pin 24 engages in one of the holes 28a in a plate 28. The angular spacing of the holes 28a for example corresponds to the angular divisions of the diaphragm scale 32a. The plate 28 has an arcuate clamping slot 28b of suitable length, a screw 30 passing through this slot and engaging in a tapped hole in the ring 26. When the pin 24 passes into one of the holes 28a and the screw 30 is tightened up, the plate 28 is firmly coupled to the ring 26 and the latter consequently so coupled to the ring 22.

The diaphragm setting ring 26 has a radial outwardly-projecting arm 26b the end of which is formed as an indicator 26c, and this is adjustable relatively to the diaphragm scale 32a. This scale is engraved on a small plate 32 connected to the housing 10. Further, the arm 26b is of a resilient nature and carries a catch 27 which engages in one of the correspondingly spaced detent notches 10f at the periphery of the housing 10.

Figure 1:
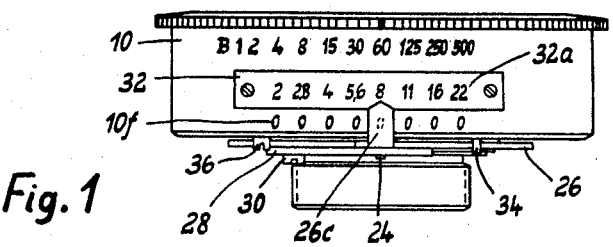
FIG. 1 is a shutter and diaphragm assembly seen in elevation.
Figure 3:
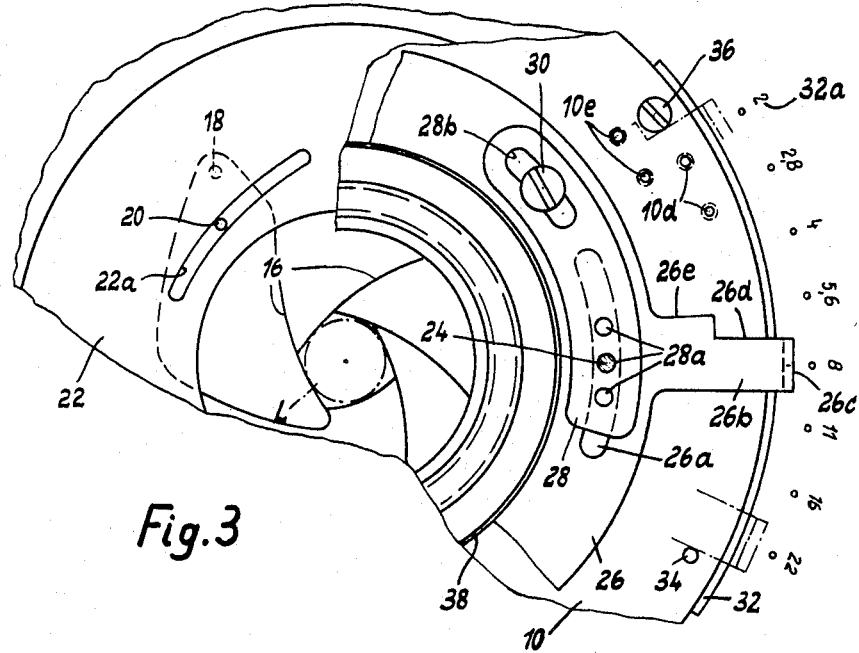
FIG. 3 is a rear view corresponding to FIG. 2.

As illustrated in the drawings, provision is made in this case of a diaphragm setting range from "2" to "22." Two limit abutments 34 and 36 are arranged on the rear wall of the housing and there associated with the arm 26b of the diaphragm setting ring 26 for the purpose of limiting the extent of this potential setting or the diaphragm setting range. In this connection the abutment 34 for the minimum diaphragm value "22" is for example stationary, whilst the abutment 36 for the maximum diaphragm value is in the form of a stop screw 36 which can be screwed into one of the various spaced threaded holes 10d and 10e in the rear wall of the housing 10. Depending on the arrangement of the abutment screw 36, the striking surface 26d or 26e of the arm 26b serves as a counter abutment on the diaphragm setting ring 26. The end range of the diaphragm setting member between values "2" to "4" can be confined in this way to the prevailing circumstances. The variable connection achieved, as described by the plate 28, between the diaphragm control ring 22 and the diaphragm setting ring 26 is used in the first place to associate with each value of the diaphragm scale which is fixed on the housing 10 a diaphragm aperture diameter which is determined by the focal length of the particular objective which is used and mounted in said housing. This diaphragm aperture diameter D (in millimetres) is given in known, calculated fashion, from the factors $f$, and W, $f$ being the focal length (in millimetres) of the objective used and W the particular value which at that time is inscribed on the diaphragm scale. This adaption is performed as follows, using the coupling according to the present invention:

In assembly, the diaphragm blades 16 (including the mounting ring 14 and the diaphragm control ring 22) are installed in the housing 10 in a condition ready for operation. The coupling pin 24 then projects outwtards through the recess 10c. The diaphragm setting ring 26 is now mounted on the shutter housing at the rear and held against axial movement by the spring 38. The slot 26c of the diaphragm control ring 26 must then surround the coupling pin 24. In addition the catch piece 27 must be in engagement with one of the detent notches 10f. At this stage the plate 28 is mounted on the diaphragm setting ring 26, it being possible to bring one of the holes 28a into register with the coupling pin 24 (FIG. 3). The plate 28 is first loosely attached to the diaphragm setting ring 26 by means of the screw 30.

It will now be assumed that, in the assembly, it is required to suit the diaphragm and the diaphragm scale to a lens having a focal length of 100 millimetres. If this adaption for example starts on the basis of a diaphragm value "8," when the indicator 26c is set to the value "8" and secured in this position by the catch piece 27, there must be a specific diaphragm diameter between the blades 16. Thus a cylindrical template L of said specific diameter (D), precalculated for said basis value "8" in the above-mentioned fashion, is inserted between the blades 16, i.e. in the diaphragm aperture, the diaphragm control ring 22 with its plate 28 are turned with respect to the secured ring 26 until the diaphragm blades 16 bear against the template L (FIG. 3). At this stage the screw 30 is tightened down, so firmly connecting the diaphragm setting ring 26 with the diaphragm control ring 22 through the plate 28.

If during this adaption the amplitude of the slot 28b not be sufficient with the plate 28 in the position illustrated, the pin 24 must be disengaged from the hole 28a and engaged in the upper or lower hole 28a.

The simple method, in accordance with this invention of adapting the diaphragm scale fixed on the housing to the diaphragm aperture diameter which varies with the focal length of the lens used in each case allows for it to be done with minimum demands, both on the shutter and diaphragm manufacture and later, that is to say during the actual assembly of the optical parts, be the assembler or camera manufacturer himself.

Another advance of the coupling or justifying arrangement according to the invention is to be observed in the fact that the detent device (10f, 27) associated with the diaphragm setting ring can be used in this or any other method of adapting the diaphragm to the focal length of the lens.

Finally, and in contrast to the embodiment which has been particularly described above, the coupling arrangement according to the invention can be used for adaption purposes even in cases where, depending on different lenses, the diaphragm diameter may be constant, but the position of the diaphragm scale value on the periphery of the shutter, and thus the position of the scale itself, has to be movable.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A diaphragm arrangement for photographic equipment, comprising diaphragm elements arranged in a housing and movable to make different diaphragm apertures, a control member for moving said diaphragm elements, a diaphragm scale provided with different diaphragm aperture values, an indicator associated with said control member and cooperating with said diaphragm scale, and coupling means arranged between said indicator and said control member for adjusting said indicator in one of different coupling positions with respect to the control member and clamping said indicator to said control member for common and parallel movement therewith.

2. A diaphragm arrangement for photographic equipment, comprising diaphragm blades arranged in a housing and movable to different aperture making positions, a control ring mounted within said housing for moving said blades, a diaphragm setting ring mounted on the housing for rotating movement and provided with an indicator, a diaphragm scale provided with different diaphragm aperture values and cooperating with said indicator, a coupling plate comprising at least one coupling opening, a coupling pin mounted on said control ring and engaging in said coupling opening of said coupling plate, and clamping means for connecting said coupling plate with said setting ring in one of different coupling positions.

3. A diaphragm arrangement as claimed in claim 2, wherein said clamping means comprises an arcuate slot in said coupling plate and a screw passing through said slot and engaging in said setting ring.

4. A diaphragm arrangement as claimed in claim 2, wherein said coupling plate comprises a plurality of coupling openings offset from one another in the peripheral direction of said rings.

5. A diaphragm arrangement for photographic equipment, comprising diaphragm elements arranged in a housing and movable to make different diaphragm apertures, a control member for moving said diaphragm elements, a diaphragm scale provided with different diaphragm aperture values, an indicator associated with said control member and cooperating with said diaphragm scale, coupling means arranged between said indicator and said control member for the purpose of adjusting and clamping said indicator in one of different coupling positions with respect to the control member, and at least an abutment associated with said housing and cooperating with said control member for the purpose of limiting the diaphragm setting range, a plurality of holes arranged in said housing offset from one another in the setting direction, said abutment being mounted in one of said holes.

6. A diaphragm arrangement as claimed in claim 5, wherein said abutment is formed as a screw engaging in one of a plurality of threaded holes in said housing.

References Cited

UNITED STATES PATENTS

| | | | |
|---|---|---|---|
| 1,521,780 | 1/1925 | Maski | 95—64 |
| 1,688,370 | 10/1928 | Wittel | 95—64 XR |
| 2,341,387 | 2/1944 | Riddell | 95—64 |
| 2,556,546 | 6/1951 | Lee | 95—64 |
| 2,974,576 | 3/1961 | Hahn | 95—64 |
| 2,989,908 | 6/1961 | Bolsey | 95—64 |

NORTON ANSHER, *Primary Examiner.*

JOSEPH F. PETERS, *Assistant Examiner.*